(12) United States Patent
Sarri et al.

(10) Patent No.: US 10,718,347 B2
(45) Date of Patent: Jul. 21, 2020

(54) TURBOMACHINERY GASKET AND A TURBOMACHINERY PROVIDED WITH SAID GASKET

(71) Applicant: Nuovo Pignone Tecnologie Srl, Florence (IT)

(72) Inventors: Franco Sarri, Florence (IT); Andrea Bernocchi, Florence (IT); Franco Smorti, Florence (IT)

(73) Assignee: Nuovo Pignone SRL, Florence (IT)

( * ) Notice: Subject to any disclaimer, the term of this patent is extended or adjusted under 35 U.S.C. 154(b) by 311 days.

(21) Appl. No.: 15/572,207

(22) PCT Filed: May 6, 2016

(86) PCT No.: PCT/EP2016/060182
§ 371 (c)(1),
(2) Date: Nov. 7, 2017

(87) PCT Pub. No.: WO2016/177880
PCT Pub. Date: Nov. 10, 2016

(65) Prior Publication Data
US 2018/0149167 A1 May 31, 2018

(30) Foreign Application Priority Data

May 7, 2015 (IT) .......................... MI2015A000645

(51) Int. Cl.
*F04D 29/16* (2006.01)
*F16J 15/44* (2006.01)
(Continued)

(52) U.S. Cl.
CPC .......... *F04D 29/083* (2013.01); *F01D 11/003* (2013.01); *F01D 11/005* (2013.01);
(Continued)

(58) Field of Classification Search
CPC .............................. F04D 29/162; F16J 15/442
See application file for complete search history.

(56) References Cited

U.S. PATENT DOCUMENTS

| RE27,350 E * | 5/1972 | Jaeger .................. F04D 29/162 |
| | | 277/411 |
| 2008/0001362 A1 | 1/2008 | Chitren et al. |
| 2015/0016988 A1 | 1/2015 | Griffin |

FOREIGN PATENT DOCUMENTS

| CN | 1042758 A | 6/1990 |
| CN | 101087969 A | 12/2007 |

(Continued)

OTHER PUBLICATIONS

Italian Search Report and Written Opinion issued in connection with corresponding IT Application No. MI2015A000645 dated Jan. 20, 2016.

(Continued)

*Primary Examiner* — Kayla McCaffrey
(74) *Attorney, Agent, or Firm* — Baker Hughes Patent Organization

(57) ABSTRACT

A turbomachinery gasket comprising at least a first curved elongated element having a coupling part configured to cooperate with a tubular assembly in order to keep the gasket in position on the tubular assembly, and an outer surface configured to seal against an outer casing provided to house the tubular assembly, the first curved elongated element comprising a first and a second free end, the first free end providing a first protruding lip and the second free end providing a second protruding lip, the first protruding lip being configured to overlap with the second protruding lip of the first curved elongated element or with a second protruding lip of a second elongated element functionally identical (Continued)

to the first one, so that, when the gasket is in use, a seal in that part of the gasket having said protruding lips is granted.

12 Claims, 4 Drawing Sheets

(51) Int. Cl.
| | |
|---|---|
| *F04D 29/08* | (2006.01) |
| *F01D 11/00* | (2006.01) |
| *F04D 17/12* | (2006.01) |
| *F04D 29/62* | (2006.01) |
| *F04D 29/42* | (2006.01) |
| *F16J 15/08* | (2006.01) |
| *F04D 29/28* | (2006.01) |
| *F04D 29/44* | (2006.01) |

(52) U.S. Cl.
CPC ....... *F04D 17/122* (2013.01); *F04D 29/4206* (2013.01); *F04D 29/624* (2013.01); *F16J 15/0818* (2013.01); *F04D 17/12* (2013.01); *F04D 29/286* (2013.01); *F04D 29/441* (2013.01); *F05D 2240/55* (2013.01); *F05D 2250/75* (2013.01); *F05D 2300/432* (2013.01)

(56) References Cited

FOREIGN PATENT DOCUMENTS

| CN | 201288823 Y | 8/2009 |
|---|---|---|
| CN | 101627184 A | 1/2010 |
| CN | 201606307 U | 10/2010 |
| FR | 2 637 948 A1 | 4/1990 |

OTHER PUBLICATIONS

International Search Report and Written Opinion issued in connection with corresponding PCT Application No. PCT/EP2016/060182 dated Sep. 8, 2016.
International Preliminary Report on Patentability issued in connection with corresponding PCT Application No. PCT/EP2016/060182 dated Nov. 7, 2017.
Search Report and Written Opinion issued in connection with corresponding BN Application No. BN/N/2017/0085 dated Oct. 31, 2018.
Machine Translation and First Office Action and Search issued in connection with corresponding CN Application No. 201680026602.1 dated Nov. 27, 2018 (Office Action translation is not available).

* cited by examiner

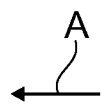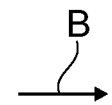
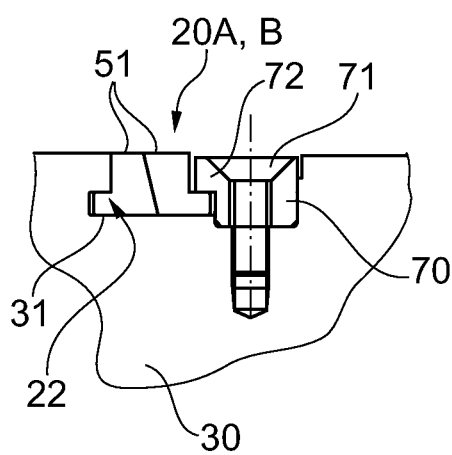
Fig. 2A
Fig. 2B
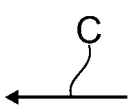
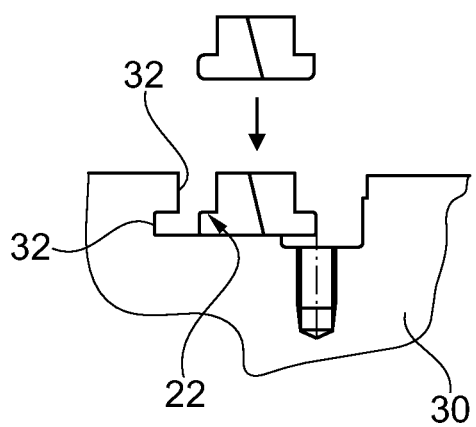
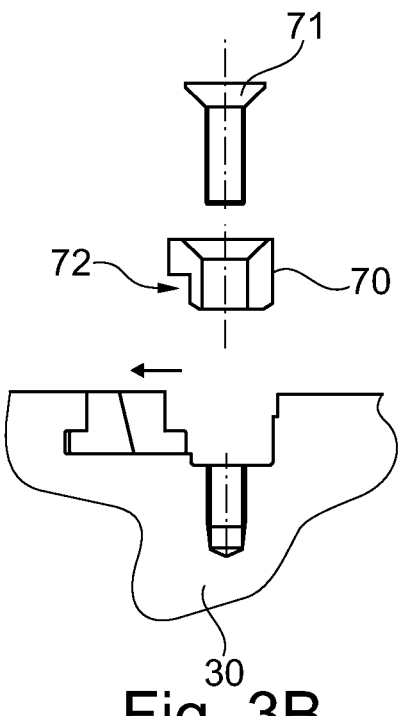
Fig. 3A
Fig. 3B

TURBOMACHINERY GASKET AND A TURBOMACHINERY PROVIDED WITH SAID GASKET

FIELD OF INVENTION

Embodiments of the subject matter disclosed herein correspond to turbomachinery gaskets, and to a turbomachinery, in particular a compressor, comprising said gasket.

BACKGROUND OF THE INVENTION

In the turbomachinery field, gaskets are used to separate zones operating at different pressures. A gasket may be located between a tubular assembly, which may be a compressor bundle formed by one or more diaphragms and a rotor, and an outer casing.

In the prior art, at least an annular groove is provided on the tubular assembly outer surface to house a closed-ring gasket, usually realized in a Teflon (PTFE) based material. In order to fit the gasket in the annular grove, the first step is to heat-up the closed-ring gasket to temporary increase its diameter. The increase of the gasket diameter makes it possible to fit it onto the tubular assembly and make the gasket slide up to the groove. When the gasket temperature decreases, its diameter reduces accordingly and the gasket remains fitted in the groove and secured to the tubular assembly.

In a large turbomachinery, that may have a tubular assembly of a diameter well above 1.5 m and up to 2.8 m, a length of 2 m to 5 m, the closed-ring gasket destined to fit on it must have similar diameters. The huge dimension of the closed-ring gasket makes it difficult to increase its temperature in a homogenous way, and to handle it once heated (it must be noted that the heating temperature may be close to 100° C.).

The existing procedure provides for the operators to heat up the gasket using portable heaters, generating a stream of hot air that can warm up only on a limited portion of the gasket. Therefore, 3-4 operators need to act at the same time on the gasket in order to heat it in a substantially homogeneous way. During the procedure, every operator must be very careful in order to avoid overheating that may permanently deform some parts of the gasket, compromising the seal.

Once the gasket is heated to the correct temperature, the operators must position it on the tubular assembly and make it slide over the tubular assembly surface up to the correct position above the groove.

During this operation, the entire tubular assembly is usually positioned on two spaced-apart supports. Therefore, in order to position the gasket, the operators need to lift the tubular assembly at least from one support and fit the gasket on the assembly. After that, they need to make the gasket slide up to a position where it does not interfere with the support, and, once that position is reached, they can lower down the tubular assembly to its original place. The last step of the procedure provides to continue the sliding movement of the gasket until it reaches the final position.

The operation, that is already not easy, is complicated by the fact the temperature of the gasket is around 100° C. This requires the operators to wear suitable protections, in order to avoid severe burnings to the skin. Moreover, the operation needs to be completed as quickly as possible, in order to avoid a cooling of the gasket.

In fact, if the gasket temperature falls below a certain limit, while it is not yet in the correct position, it may remain blocked on the tubular assembly due to its diameter reduction, and it may be difficult to re-position it.

It is also to be noted that, in the prior art, once the gasket is positioned in the groove, it is very difficult to heat it up to the correct temperature in order to remove it. Therefore, most of the times, an installed gasket need to be destroyed and it cannot be re-used.

BRIEF DESCRIPTION OF THE INVENTION

Therefore, there is a general need to provide a turbomachinery gasket that may be easily and quickly installed even on the tubular assembly of a large turbomachinery.

In particular, there is a need to provide a turbomachinery gasket that may be installed on the tubular assembly even by a single operator.

Moreover, there is a need to provide a turbomachinery gasket that can be installed on the tubular assembly avoiding the risk of severe burnings to the operators.

Furthermore, there is a need to provide a turbomachinery gasket that, if needed, may be removed from the tubular assembly in a simple way and re-used or repaired.

An important idea is to use a split gasket.

Another important idea is to provide the gasket with overlapping lips.

Again, another important idea is to fit the gasket on the tubular assembly in an undercut manner.

Embodiments of the subject matter disclosed herein correspond to a turbomachinery gasket.

Embodiments of the subject matter disclosed herein correspond to a turbomachinery comprising the gasket, in particular a rotating compressor.

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings:

FIG. 2A is an enlarged partial and simplified view of that part of FIG. 1, indicated with the reference numbers 20A, 20B, showing a section of a turbomachinery gasket, where section lines are omitted;

FIG. 2B is an enlarged partial and simplified view of that part of FIG. 1, indicated with the reference numbers 21, showing a section of a turbomachinery gasket, where section lines are omitted;

FIGS. 3A and 3B show schematically the mounting steps of the turbomachinery gasket of FIG. 2A.

DETAILED DESCRIPTION

The following description of exemplary embodiments refers to the accompanying drawings.

The following description does not limit the invention. Instead, the scope of in an embodiment defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
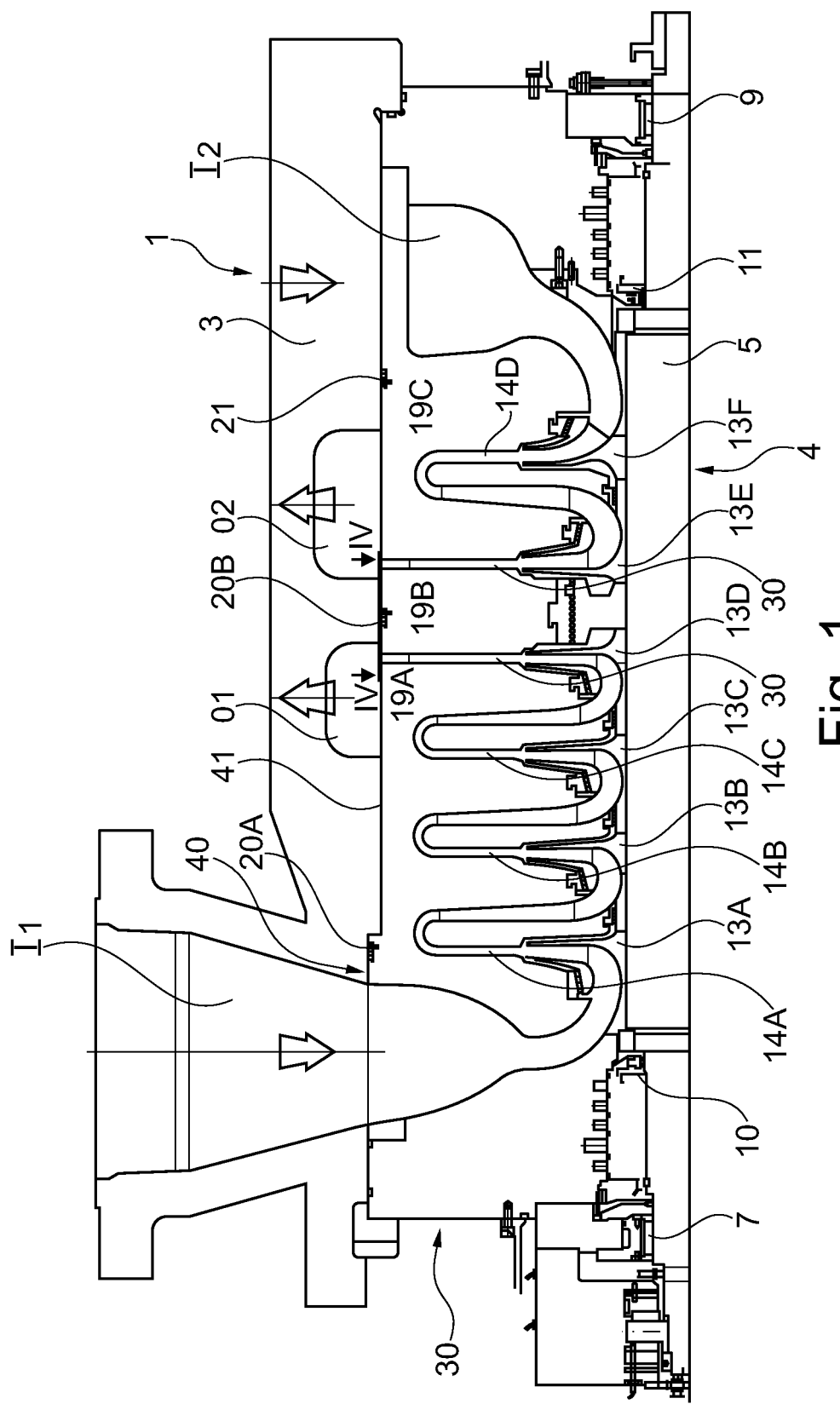
FIG. 1 shows a partial, schematic and simplified view of a turbomachinery, in particular a rotating compressor.

FIG. 1 illustrates a simplified sectional view (where section lines are omitted), of a turbomachinery, in particular a multistage centrifugal compressor 1 according to the present disclosure. The multistage centrifugal compressor 1 comprises a casing 3 wherein a rotor 4 is rotatingly supported.

The rotor 4 may comprise a rotor shaft 5 supported by bearings 7 and 9. Seals 10 and 11 may be provided to isolate the interior of the compressor 1 from the environment.

In some embodiments, one or more impellers may be mounted on the shaft 5. In the exemplary embodiment of FIG. 1 the compressor 1 is a multistage centrifugal compressor comprising two compressor units each comprised of respective impellers. The first compressor unit impellers are indicated 13A, 13B, 13C, 13D, while the second compressor unit impellers are indicated with 13E and 13F. The impellers will be referred cumulatively also as impellers 13.

In some embodiments the impellers 13 can be keyed on the rotor shaft. Other structures are, however, possible.

Each impeller 13A-13D of the first compressor unit is combined with a stator channel 14A, 14B, 14C, formed in a first diaphragm 19A. A second diaphragm 19B separates the two compression units and defines outlet channels O1, O2 for the two compressor units. A third diaphragm 19C defines a stator channel 14D for the second compressor unit. Diaphragms may be cumulatively referred as 19.

In some embodiments, the first, second and third diaphragms 19 can be monolithic as hereby described. In other embodiments, they can be formed by separate and stacked components. The diaphragms 19 and the rotor 4 form part of a tubular assembly 30 (or bundle), which is housed in the compressor casing 3. The gas enters each compressor through gas inlets I1, I2 and is delivered sequentially through the impellers of each compressor, exiting the last impeller 13 D, 13E of each compressor and discharged through gas outlets O1, O2.

According to one aspect of the subject matter disclosed herein between the tubular assembly 30 and the outer casing 3 turbomachinery gaskets 20, 21 are provided in order to sealedly separate regions of the compressor subject to different pressures.

In the present example a first gasket 20A separates that part of the tubular assembly 30 subject to the outlet O1 pressure, form that part of the tubular assembly subject to the inlet I1 pressure. A second gasket 20B separates that part of the tubular assembly subject to the outlet O1 pressure from that part of the tubular assembly 30 subject to the outlet O2 pressure. The pressure present at the outlet O2 is greater both of the inlet O2 pressure and of the outlet O1 pressure. A third gasket 21 separates the parts of the tubular assembly subject the outlet O2 pressure and the inlet I2 pressure. The third gasket 21 is usually identical to the gaskets 20B except for its mounting orientation on the tubular assembly 30.

More in detail, the first 20A and the second gasket 20B may seal a pressure pushing the gaskets 20 in the direction of the arrow A of FIG. 2A. The third gasket 21 may seal a pressure pushing the gasket 21 in the direction of arrow B of FIG. 2B.

According to one embodiment, the gasket 20A is realized in a single curved elongated element 50. Other embodiments will be described later, where the gasket is realized in two or more elongated elements 50, 50' functionally identical each other, that, when assembled, form a sealing ring.

The gasket has an outer surface 51, that may be cylindrical, and it is configured to seal against the outer casing 3, provided to house the tubular assembly 30.

The curved elongated element 50 comprises a first 52 and a second free end 53, respectively having a first 52A and a second protruding lip 53A. The first 52A and the second protruding lip 53A of the gasket 20 are configured to overlap each other in an embodiment in the direction of the pressure that the gasket may contain (arrow A of FIG. 2A) to grant a seal.

Figure 5:
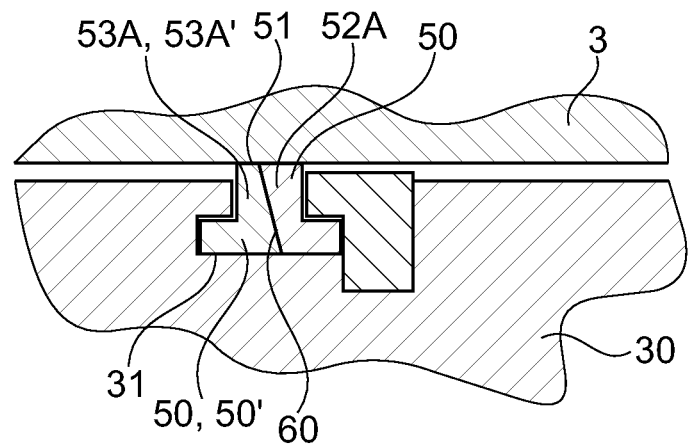
FIG. 5 is a section view taken along line V-V of FIG. 4.
Figure 4:
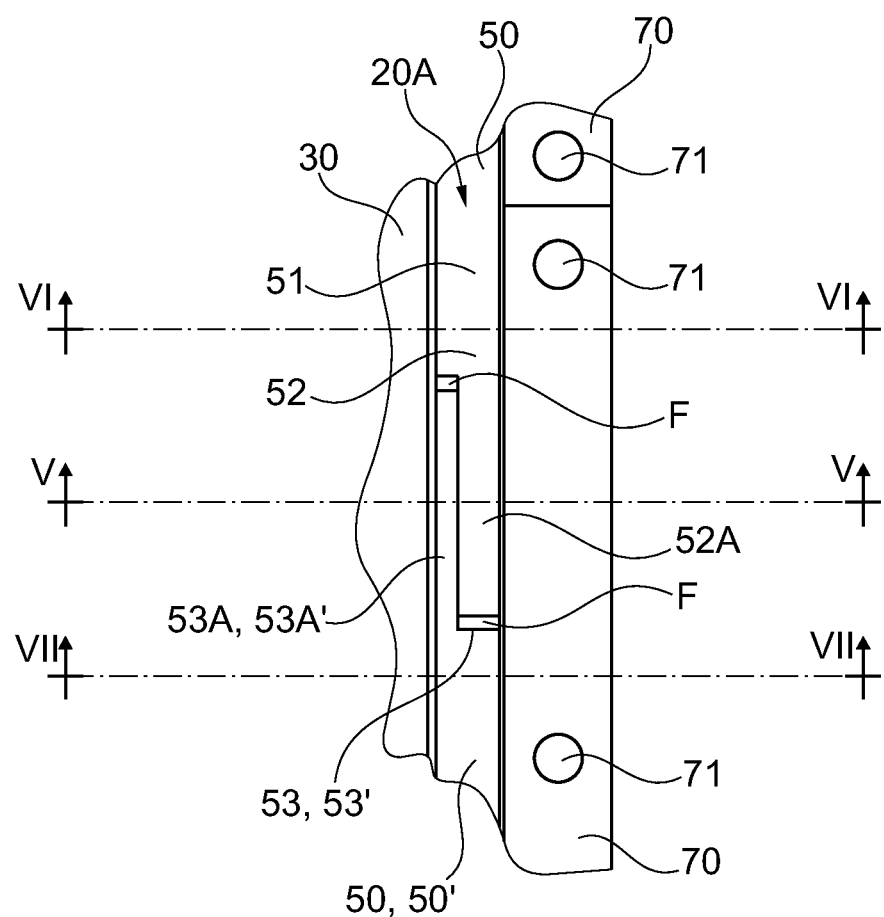
FIG. 4 is a schematic view taken on the line IV-IV of FIG. 1.
Figure 6:
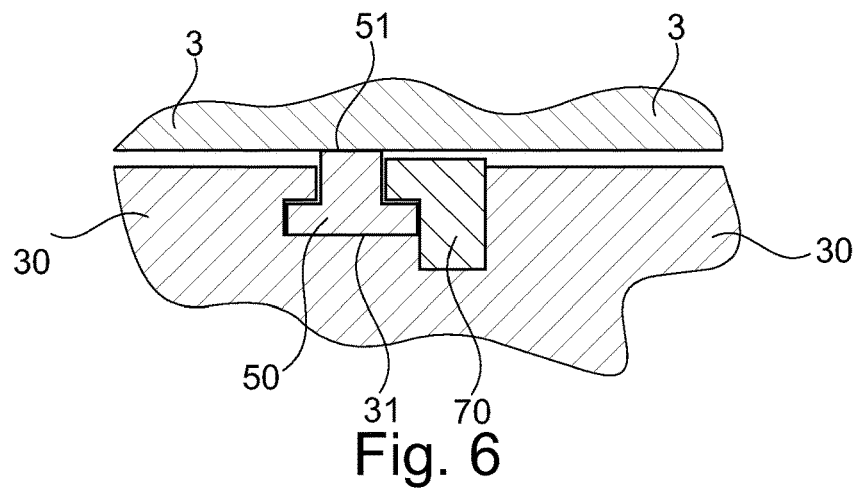
FIG. 6 is a section view taken along line VI-VI of FIG. 4.
Figure 7:
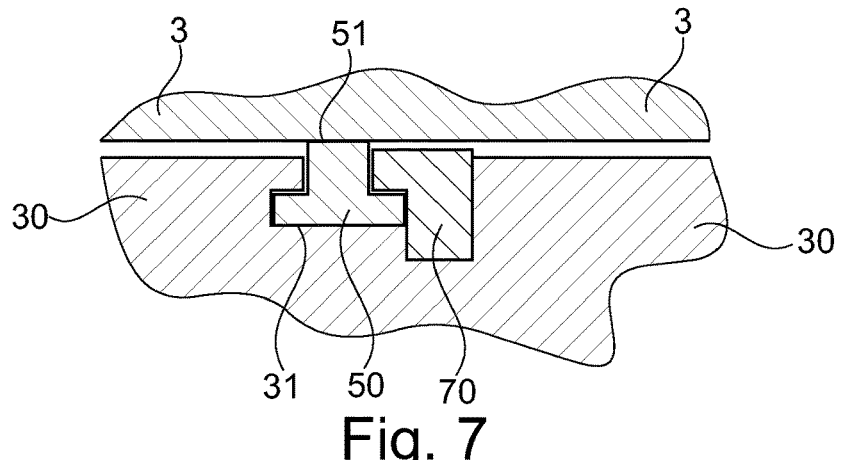
FIG. 7 is a section view taken along line VII-VII of FIG. 5.

As it may be noted in FIGS. 4 and 5, each protruding lip 52A, 53A has a cross-section having a reduced area with respect to the area of a cross-section taken in that part of the elongated element 50 comprised between the free ends 52, 53 (see FIG. 6).

The cross-section of two protruding lips 52A, 53A positioned with a surface 60 in reciprocal contact (FIG. 5) may correspond to the cross-section taken in that part of the elongated element 50 comprised between its free ends (FIG. 6).

Furthermore, the protruding lips may have surface 60 of reciprocal contact that, in cross section (FIG. 5), is inclined with respect to the gasket outer surface 51.

With reference to FIG. 2A the tubular assembly 30 provides an annular groove 31 housing the gasket. The annular groove 31 presents at least one wall 32 having a reversed L shaped edge (with reference to FIG. 2A). The gasket 20A also presents an L shaped wall 22 that may fit in undercut manner with the reversed L-shaped edge 32 of the groove wall. It should be noted that the shape of the groove wall 32 and of the gasket wall 22 facing it may have different shapes from the one described. An important feature it that the gasket provides a coupling part 22 that is configured to cooperate with the tubular assembly 30 in order to keep the gasket in position on the tubular assembly 30. That part 22 may be configured to cooperate in undercut manner at least with a correspondent part 32 of the tubular assembly 30.

To fix the gasket on the tubular assembly 3, at least a retaining element 70 may be provided. The retaining element 70 is fixed by screws 71 to the tubular assembly 30, and may be formed in two or more parts, that may have a configuration of circular segments so as to jointly form a circle.

The retaining element may also be configured to fix the gasket 20, 21 in an undercut manner, as it may be appreciated from FIG. 5. In the present example the retaining element 70 have a wall 72 configured exactly like the grove wall 32.

As it is clear from the section of FIG. 5, when the retaining element cooperates with the groove to keep the turbomachinery gasket in position, i.e. when it is screwed to the tubular assembly, a T-shaped or L-shaped space (in section) is defined between the groove 31 and the retaining element 70.

In the description above the gasket is made of a single elongated curved element.

When mounting the gasket 22, that may be realized of an elastomeric material, in particular PTFE, it is possible to elastically deform the gasket distancing its free ends. In this way it is very simple to fit the gasket onto the tubular element by making it slip on the tubular element itself up to the groove.

When the gasket is placed in the groove (FIG. 3A) the gasket is pushed in the direction of the arrow C, and fitted with the groove wall 32. Finally, the retaining elements are fixed with dedicated screws 71.

It should be noted the when the gasket 22 is mounted a gap F is present between the external part of the lips. This gap is useful to prevent a deformation of the gasket caused by a dilatation of the material forming it, when its temperature increases during the compressor operation.

Figure 8:
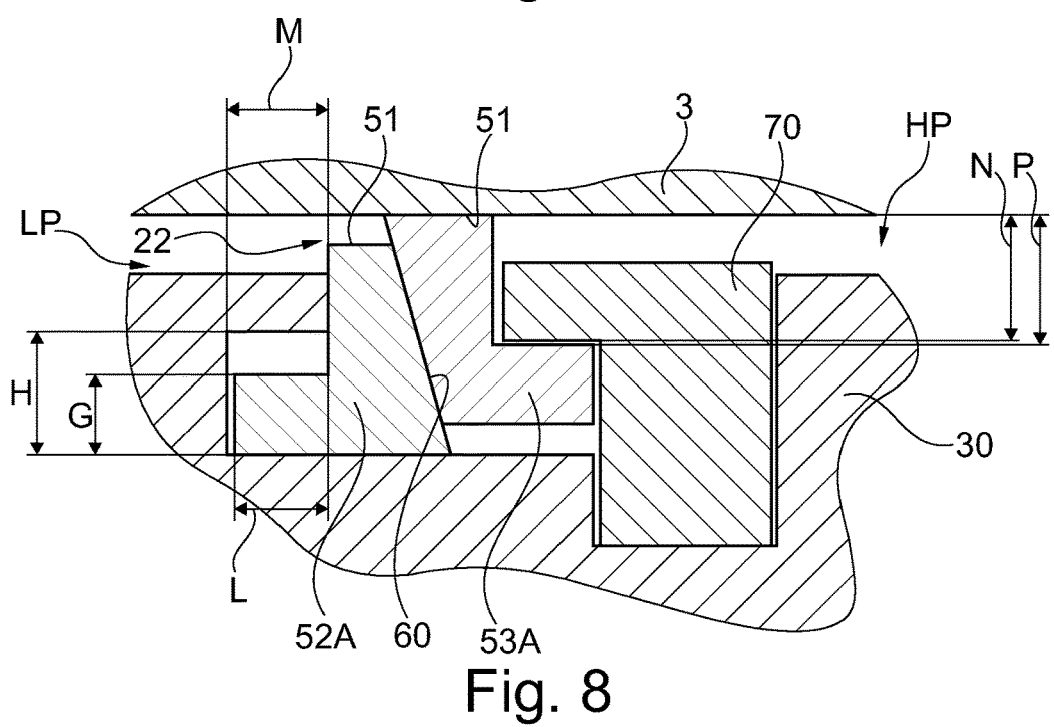
FIG. 8 is a section view taken along line V-V when the turbomachine is in operation.

During the operation of the turbomachinery 1, the gasket 22, in that part where protruding lips 52A, 53A are superposed, slightly deforms as shown in FIG. 8, in order to grant a seal. In particular, the pressure HP, higher than the pressure LP, pushes the gasket 22 in the left side part of FIG. 8.

The first lip 52A of the gasket come into contact with the groove wall 32 and due to the presence of the inclined surface 60, the second lip 53A is pushed against the casing 3, creating a seal.

In order to allow the movements and deformation as described above, distance G must be less than distance H, distance N must be less than distance P and distance L should be less than distance M.

In the present description, even if the term "seal" was used to define the scope of the gasket 22, a negligible leakage through the gasket may still be tolerated and do not compromise the performance of the seal.

In a different embodiment the gasket 22, may be realized in two or more curved elongated elements 50, 50' shaped as ring sectors, that when joined may form a full ring. The joining part between two different elongated elements 50, 50', and between two free ends of the same element 50 is basically the same, and it is represented in FIGS. 4 and 5. Each elongated sector 50, 50' has protruding lips 52A, 53A' functionally identical to the ones described and configured to cooperate and work in the same way as above described.

It should be noted that in this case the groove 31 may have a constant cross section, as in the embodiment above described.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A turbomachinery gasket comprising:
   an outer surface configured to seal against a casing which houses a tubular assembly of a turbomachine; and
   at least one curved elongated element comprising a coupling part configured to cooperate with the tubular assembly to keep the turbomachinery gasket in position on the tubular assembly, a first free end and a second free end, the first free end comprising a first protruding lip and the second free end comprising a second protruding lip, the first protruding lip being configured to overlap with the second protruding lip to form a seal when the turbomachine is operating,
   wherein the first protruding lip defines a first surface that, in cross section, is inclined relative to the outer surface, and the second protruding lip defines a second surface that is in reciprocal contact with the first surface.

2. The turbomachinery gasket of claim 1, wherein at least a part of the cross-section of the at least one curved elongated element is T-shaped or L-shaped.

3. The turbomachine of claim 1, wherein the at least one curved elongated element is made of a plastic material.

4. The turbomachine of claim 3, wherein the plastic material is FTFE.

5. A turbomachine comprising:
   an outer casing;
   a tubular assembly housed within the outer casing, the tubular assembly comprising a rotor with a series of impellers and a stator, within which the impellers may rotate, having at least one diaphragm defining stator channels to collect a fluid leaving the impellers,
   at least one turbomachinery gasket between the outer casing and the tubular assembly and sealedly separating at least two regions of the turbomachinery having different pressures, the at least one turbomachinery gasket comprising:
   an outer surface configured to seal against a casing which houses a tubular assembly of a turbomachine; and
   at least one curved elongated element comprising a coupling part configured to cooperate with the tubular assembly to keep the turbomachinery gasket in position on the tubular assembly, a first free end and a second free end, the first free end comprising a first protruding lip and the second free end comprising a second protruding lip, the first protruding lip being configured to overlap with the second protruding lip to form a seal when the turbomachine is operating,
   wherein the first protruding lip defines a first surface that, in cross section, is inclined relative to the outer surface, and the second protruding lip defines a second surface that is in reciprocal contact with the first surface.

6. The turbomachine of claim 5, wherein the tubular assembly comprises a groove housing the turbomachinery gasket.

7. The turbomachine of claim 6, wherein the tubular assembly comprises a retaining element cooperating with the groove to keep the turbomachinery gasket in position.

8. The turbomachine of claim 7, wherein the retaining element comprises a set of retaining sectors removably fixed to the tubular assembly and configured to jointly form a circle.

9. The turbomachine of claim 7, wherein, when the retaining element cooperates with the groove to keep the turbomachinery gasket in position, a T-shaped or L-shaped space is defined by the groove and the retaining element.

10. The turbomachine of claim 7, wherein the retaining element is made of metallic material.

11. The turbomachine of claim 10, wherein the at least one curved elongated element is made of plastic material.

12. A turbomachinery gasket comprising:
    an outer surface configured to seal against a casing which houses a tubular assembly of a turbomachine; and
    at least two curved elongated elements, each of the at least two curved elongated elements comprising a respective: coupling part configured to cooperate with the tubular assembly to keep the turbomachinery gasket in position on the tubular assembly, a first free end and a second free end, the first free end comprising a first protruding lip and the second free end comprising a second protruding lip, the first protruding lip being configured to overlap with the second protruding lip to form a seal when the turbomachine is operating, wherein the first protruding lip defines a first surface that, in cross section, is inclined relative to the outer surface, and the second protruding lip defines a second surface that is in reciprocal contact with the first surface.

\* \* \* \* \*